United States Patent
Zhang

(10) Patent No.: US 12,257,867 B2
(45) Date of Patent: Mar. 25, 2025

(54) STEEL CORD FOR RUBBER REINFORCEMENT

(71) Applicant: NV Bekaert SA, Zwevegem (BE)

(72) Inventor: Aijun Zhang, Jiangyin (CN)

(73) Assignee: NV Bekaert SA, Zwevegem (BE)

( * ) Notice: Subject to any disclaimer, the term of this patent is extended or adjusted under 35 U.S.C. 154(b) by 48 days.

(21) Appl. No.: 18/268,501

(22) PCT Filed: Nov. 30, 2021

(86) PCT No.: PCT/EP2021/083627
§ 371 (c)(1),
(2) Date: Jun. 20, 2023

(87) PCT Pub. No.: WO2022/135850
PCT Pub. Date: Jun. 30, 2022

(65) Prior Publication Data
US 2024/0075772 A1    Mar. 7, 2024

(30) Foreign Application Priority Data

Dec. 21, 2020    (WO) ................ PCT/CN2020/138103

(51) Int. Cl.
*B60C 9/20* (2006.01)
*D07B 1/06* (2006.01)

(52) U.S. Cl.
CPC .......... *B60C 9/2006* (2013.01); *D07B 1/0633* (2013.01); *B60C 2009/2077* (2013.01);
(Continued)

(58) Field of Classification Search
CPC ................ B60C 9/2006; D07B 1/0633; D07B 2205/3025; D07B 2501/2046
See application file for complete search history.

(56) References Cited

U.S. PATENT DOCUMENTS

| 6,076,344 A | * | 6/2000 | Doujak | .................. D07B 7/025 57/9 |
| 2012/0318428 A1 | * | 12/2012 | Domingo | .............. B60C 9/0007 152/557 |

(Continued)

FOREIGN PATENT DOCUMENTS

| CN | 109338771 | 2/2019 |
| EP | 0 635 597 | 7/1994 |

(Continued)

OTHER PUBLICATIONS

International Search Report and Written Opinion of the International Search Authority issued Mar. 22, 2022 in International (PCT) Application No. PCT/EP2021/083627.

*Primary Examiner* — Patrick J. Lynch
(74) *Attorney, Agent, or Firm* — WENDEROTH, LIND & PONACK. L.L.P.

(57) ABSTRACT

A steel cord for rubber reinforcement that has a construction with an outer layer and an inner strand surrounded by and adjacent to the outer layer, the inner strand having at least one steel filament with a number of $N_1$ and an average diameter of $d_1$ expressed in mm, the outer layer having steel filaments with a number of $N_2$ and an average diameter of $d_2$ expressed in mm. The inner strand has a torque $T_1$ and the outer layer has a torque $T_2$, the relation between $T_1$ and $T_2$ is defined. By doing this, the tip rise problem of the rubber ply reinforced by steel cords is reduced.

13 Claims, 1 Drawing Sheet

Figure 1:
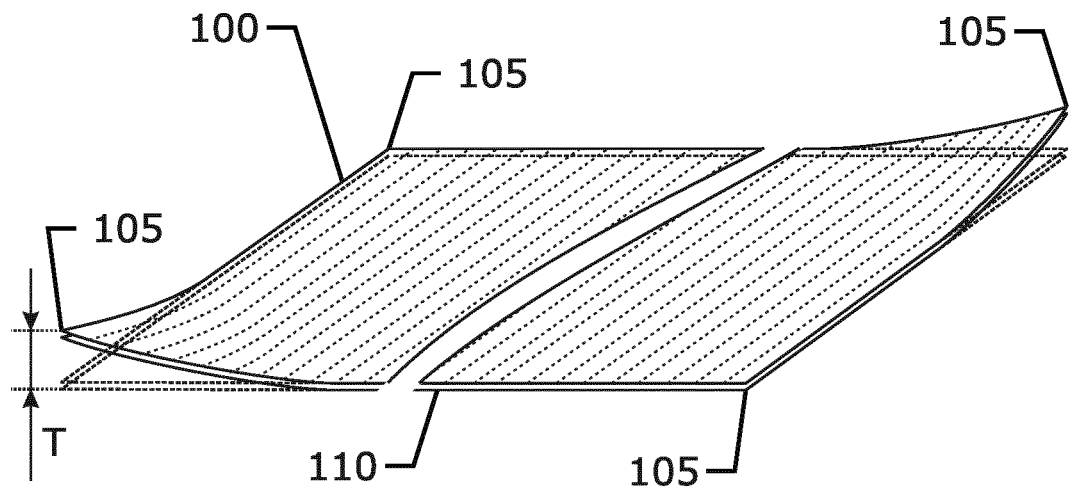

(52) U.S. Cl.
CPC ................ *B60C 2009/2096* (2013.01); *D07B 2205/3025* (2013.01); *D07B 2501/2046* (2013.01)

(56) References Cited

U.S. PATENT DOCUMENTS

2017/0073888 A1\* 3/2017 Gallet .................... D07B 7/022
2018/0171551 A1\* 6/2018 Calvet ..................... D07B 3/00

FOREIGN PATENT DOCUMENTS

JP 2009-249757 10/2009
WO 2014/166673 10/2014

\* cited by examiner

STEEL CORD FOR RUBBER REINFORCEMENT

TECHNICAL FIELD

The invention relates to a steel cord for rubber reinforcement. The invention also relates to a tire reinforced by the invention steel cords.

BACKGROUND ART

Steel cords are widely used for reinforcing the rubber product, such as rubber belt, rubber tire or hose, since the steel cords can provide sufficient strength to the rubber product and have good adhesion with the rubber.

Radial tire, one type of the tire, comprises at least one belt layer, at least one carcass layer, at least one tread layer and a pair of bead portions. The radial tire has various structures with different designs on belt layer, carcass layer or tread layer according to the application of the tire. Steel cords are applied in the belt layer, carcass layer and/or chafer for providing the desired strength to the tire. Depending on the different tire portion for the application of the steel cord, the steel cord is designed with different construction and performance parameter.

A rubber ply with embedded steel cords is one component for making a belt layer, carcass layer and/or chafer. The rubber ply is processed by being cut into small pieces with a certain length, width and thickness. The rubberized steel cord ply is being cut with an angle oblique with the longitudinal axis of the rubberized steel cord ply or being cut perpendicularly to the longitudinal axis of the rubberized steel cord ply. Subsequently, the small pieces of rubber ply, all with the same shape are spliced to a desired length for one tire by machine.

It occurs that after cutting, one or some of the four corners of the small piece of rubberized steel cord ply sometimes rise out of the plane. If the corner rises above a certain height such as ten or more millimetres, this will make the automatic machine splicing impossible, then the splicing can only be done manually, and this leads to a reduced working efficiency. This is deemed as the occurrence of "tip rise problem". This problem relatively more occurred when the steel cord has a layered construction.

US2017073888 discloses a steel cord comprising a core group and a sheath group to form a construction of m+n. This steel cord has no residual torsions by making the ratio of the absolute value of the difference in residual torsions of the core group and the sheath group to the absolute value of the difference in saturation level between the core group and the sheath group in a certain value range, as a result, the tip rise of a rubber ply reinforced with such steel cords is low or zero.

DISCLOSURE OF INVENTION

The primary object of the invention is to solve the problem of the prior art.

Another object of the invention is to provide a steel cord for reducing the problem of tip rise of rubber ply.

A further object of the invention is to provide a tire with an improved working efficiency.

According to one aspect of the invention, a steel cord is provided, this steel cord has a construction comprising an outer layer and an inner strand surrounded by and adjacent to the outer layer, the inner strand comprises at least one steel filament with a number of $N_1$ and an average diameter of $d_1$ expressed in mm, the outer layer comprises steel filaments with a number of $N_2$ and an average diameter of $d_2$ expressed in mm, the inner strand has a torque $T_1$ and the outer layer has a torque $T_2$, $T_1$ and $T_2$ satisfy the following formulas:

$$T_1 = G \times RT_1 \times \pi^2 \times D_1^2 \times d_1^2 \times N_1 / 16000,$$

$$T_2 = G \times RT_2 \times \pi^2 \times (D_1^2 + D_2^2) \times d_2^2 \times N_2 / 16000,$$

$$|T_1 + T_2| < 60,$$

Wherein, $D_1$ is the theoretical diameter of the inner strand while $D_2$ is the theoretical diameter of the steel cord, both $D_1$ and $D_2$ are expressed in mm, $RT_1$ is the residual torsion of the inner strand while $RT_2$ is the residual torsion of the outer layer, both $RT_1$ and $RT_2$ are expressed in the number of turns per meter in "+" if in clockwise direction or "−" if in anticlockwise direction, $G$ is 80000 N/mm², the absolute value of $RT_1$ is no less than 0.05 turns per meter, and the absolute value of $RT_2$ is less than 2 turns per meter.

By defining the torque of the inner strand and the torque of the outer layer satisfying the above formula, the occurrence of the tip rise problem of rubber ply with steel cord embedded in is reduced. Both the torque of the inner strand and the torque of the outer layer of the steel cord are relevant to the occurrence of the tip rise problem of rubber ply. The smaller the sum of the torque of the inner strand and the torque of the outer layer, the less the occurrence of the tip rise problem of rubber ply.

Different from the prior art defining the residual torsion of the different layers and/or the residual torsion of the cord, the invention defines the torque of the inner strand and the torque of the outer layer based on a certain residual torsion of the outer layer and a certain residual torsion of the inner strand to reduce the occurrence of the tip rise problem of rubber ply.

Preferably, $|T_1 + T_2| < 50$. Mostly preferably, $|T_1 + T_2| < 40$.

According to the invention, the absolute value of $RT_1$ is preferably no less than 0.1 turns per meter.

Preferably, the absolute value of $RT_2$ is no less than 0.05 turns per meter. More preferably, the absolute value of $RT_2$ is no less than 0.1 turns per meter. The present invention contributes a lot when $RT_2$ is in this value range.

To reduce the tip rise problem of rubber ply, preferably, $|RT_1 + RT_2| < 4$. More preferably, $|RT_1 + RT_2| < 2$. The occurrence of the tip rise problem of rubber ply is thereby reduced very much.

The invention is for a steel cord with a construction of two, three or more layers.

$D_1$ is the theoretical diameter of the inner strand while $D_2$ is the theoretical diameter of the steel cord, i.e. the theoretical diameter of the outer layer. The theoretical diameter is a calculated diameter when presuming that the layer or the strand of the steel cord is in the form of a circle, according to the steel cord construction, steel filament diameter and the number of the steel filament.

When the steel cord has a construction of two layers, $N_1$ is 1, 2, 3 or 4. The calculation formula of $D_2$ is: $D_2 = D_1 + 2 \times d_2$; and the calculation formula of $D_1$ is:

when $N_1$ is 1, $D_1 = d_1$, or
when $N_1$ is 2, $D_1 = 2 \times d_1$, or
when $N_1$ is 3, $D_1 = 2.155 \times d_1$, or
when $N_1$ is 4, $D_1 = 2.414 \times d_1$.

When the steel cord has a construction with three layers which means the inner strand comprises an intermediate layer and a core layer surrounded by the intermediate layer, the intermediate layer is surrounded by and adjacent to the outer layer, the core layer comprises at least one steel filament with a number of $N_c$ and with an average diameter of $d_c$, the intermediate layer comprises steel filaments with an average diameter of $d_m$, the calculation formula of $D_2$ is: $D_2=D_1+2xd_2$; and the calculation formula of $D_1$ is:
when $N_c$ is 1, $D_1=d_c+2xd_m$, or
when $N_c$ is 2, $D_1=2xd_c+2xd_m$, or
when $N_c$ is 3, $D_1=2.155xd_c+2xd_m$, or
when $N_c$ is 4, $D_1=2.414xd_c+2xd_m$.

According to the present invention, the steel cord has a construction of 1+3, 1+4, 1+5, 1+6, 1+7, 2+2, 2+3, 2+4, 2+5, 2+5 cc, 2+6, 2+7, 2+7 cc, 2+8, 3+2, 3+3, 3+6, 3+8, 3+8 cc, 3+9, 3+9 cc, 4+3, 4+6, 1+3+8, 1+4+8 cc, 1+4+9, 1+5+10, 1+5+10 cc, 1+6+11, 1+6+12, 1+6+12 cc, 2+5+10, 2+6+12, 3+8+13, 3+9+15 or 4+10+16.

The invention is benefit for the steel cord having steel filaments with very high tensile strength. Preferably, each steel filament of the steel cord has a tensile strength of TS satisfying, TS≥4000-2000xd, d is the diameter of the individual steel filament, more preferably, TS≥4100-2000xd.

The inner strand and the outer layer individually have a twist pitch of less than 40 mm, alternatively the inner strand has a twist pitch of more than 300 mm while the outer layer has a twist pitch of less than 40 mm.

According to a second aspect of the invention, a tire is provided. The tire comprises at least one belt layer, at least one carcass layer, at least one tread layer and a pair of bead portions, wherein the belt layer and/or said carcass layer comprises at least one steel cord, this steel cord has a construction comprising an outer layer and an inner strand surrounded by and adjacent to the outer layer, the inner strand comprises at least one steel filament with a number of $N_1$ and an average diameter of $d_1$, the outer layer comprises steel filaments with a number of $N_2$ and an average diameter of $d_2$, the inner strand has a torque $T_1$ and the outer layer has a torque $T_2$, $T_1$ and $T_2$ satisfy the following formulas:

$$T_1=G \times RT_1 \times \pi^2 \times D_1^2 \times d_1^2 \times N_1/16000,$$

$$T_2=G \times RT_2 \times \pi^2 \times (D_1^2+D_2^2) \times d_2^2 \times N_2/16000,$$

$$|T_1+T_2|<60,$$

Wherein, $D_1$ is the theoretical diameter of the inner strand while $D_2$ is the theoretical diameter of the steel cord, both $D_1$ and $D_2$ are expressed in mm, $RT_1$ is the residual torsion of the inner strand while $RT_2$ is the residual torsion of the outer layer, both $RT_1$ and $RT_2$ are expressed in the number of turns per meter in "+" if in clockwise direction or "−" if in anticlockwise direction, G is 80000 N/mm², the absolute value of $RT_1$ is no less than 0.05 turns per meter, and the absolute value of $RT_2$ is less than 2 turns per meter.

BRIEF DESCRIPTION OF FIGURES IN THE DRAWINGS

FIG. 1 describes the measurement of the tip rise of rubber ply.

Figure 2A:
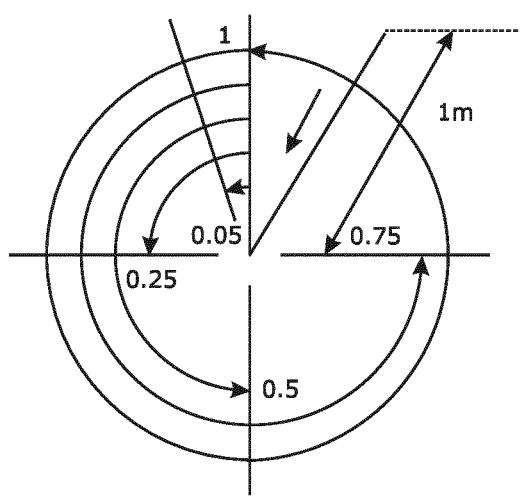
Figure 2B:
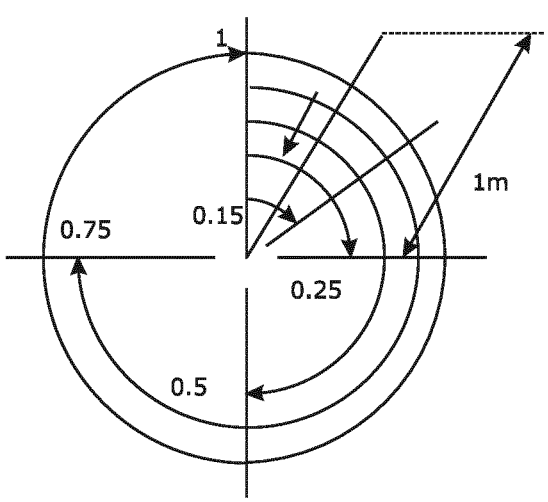

FIGS. 2a-2b describe the measurement of the residual torsion.

MODE(S) FOR CARRYING OUT THE INVENTION

The steel filaments for steel cord are made from a wire rod.

The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter, e.g., at about 3.0 to 3.5 mm, the dry drawn steel filament is subjected to a first intermediate heat treatment, called patenting. Patenting means first austenitizing until a temperature of about 1000° C. followed by a transformation phase from austenite to pearlite at a temperature of about 600-650° C. The steel filament is then ready for further mechanical deformation.

Thereafter the steel filament is further dry drawn from the first intermediate diameter until a second intermediate diameter in a second number of diameter reduction steps. The second diameter typically ranges from 1.0 mm to 2.5 mm.

At this second intermediate diameter, the steel filament is subjected to a second patenting treatment, i.e., austenitizing again at a temperature of about 1000° C. and thereafter quenching at a temperature of 600 to 650° C. to allow for transformation to pearlite.

If the total reduction in the first and second dry drawing step is not too big a direct drawing operation can be done from wire rod till second intermediate diameter.

After this second patenting treatment, the steel filament is usually provided with a brass coating: copper is plated on the steel filament and zinc is plated on the copper. A thermo-diffusion treatment is applied to form the brass coating. Alternatively, the steel filament can be provided with a ternary alloy coating, including copper, zinc and a third alloy of cobalt, titanium, nickel, iron, or other known metal.

The brass-coated or the ternary alloy coated steel filament is then subjected to a final series of cross-section reductions by means of wet drawing machines. The final product is a steel filament with a carbon content higher than 0.70 percent by weight, or no less than 0.80 percent by weight, or even higher than 0.90 percent by weight, with a tensile strength (TS) typically above 3000 MPa and adapted for the reinforcement of rubber products.

Steel filaments adapted for the reinforcement of tires typically have a final diameter ranging from 0.05 mm to 0.60 mm, e.g., from 0.10 mm to 0.40 mm. Examples of wire diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm. Better that the diameter the steel filament is in the range of 0.10 mm-0.50 mm.

A number of steel filaments are twisted by the existing steel cord making process, i.e., cabling or bunching process, to form a steel cord having a construction comprising an outer layer and an inner strand surrounded by and adjacent to the outer layer.

Based on the construction of the steel cord, the torque of the inner strand, the torque of the outer layer, the residual torsion of the inner strand and the residual torsion of the outer layer are set according to the invention formula. The pre-determined residual torsion of the inner strand and the pre-determined residual torsion of the outer layer can be realized by the existing method for residual torsion control, for example using false twister or straightener after twisting.

Table 1 summarize the performance of the inventions and the references.

TABLE 1

|  | Invention 1 | Invention 2 | Invention 3 | Invention 4 | Invention 5 | Reference 1 | Reference 2 |
|---|---|---|---|---|---|---|---|
| Construction | 3 + 8 | 3 + 8 | 2 + 7 | 3 + 9 + 15 | 1 + 6 | 3 + 9 | 3 + 8 |
| $d_c$ (mm) | — | — | — | 0.20 | — | — | — |
| $d_m$ (mm) | — | — | — | 0.20 | — | — | — |
| $d_1$ (mm) | 0.33 | 0.36 | 0.33 | 0.20 | 0.33 | 0.34 | 0.35 |
| $d_2$ (mm) | 0.33 | 0.30 | 0.33 | 0.20 | 0.33 | 0.315 | 0.35 |
| $N_c$ | — | — | — | 3 | — | — | — |
| $N_1$ | 3 | 3 | 2 | 12 | 1 | 3 | 3 |
| $N_2$ | 8 | 8 | 7 | 15 | 6 | 9 | 8 |
| $D_1$ (mm) | 0.71 | 0.78 | 0.66 | 0.83 | 0.33 | 0.73 | 0.75 |
| $D_2$ (mm) | 1.37 | 1.38 | 1.32 | 1.23 | 0.99 | 1.36 | 1.45 |
| Twist pitch of inner strand (mm) | 10 | 10 | 8 | 12.5 | >300 mm | 10 | 10 |
| Twist pitch of outer layer (mm) | 20 | 20 | 16 | 15 | 16 | 20 | 20 |
| $RT_1$ (turns/m) | +1.40 | +2.00 | +2.00 | −1.55 | +2.00 | +2.50 | −4.25 |
| $RT_2$ (turns/m) | −0.40 | −0.75 | −0.75 | −0.25 | −0.75 | −0.95 | 0.95 |
| Cord residual torsion (turns/m) | 0 | 0 | 0 | 0 | 0 | 0 | 0 |
| $|RT_1 + RT_2|$ (turns/m) | 1 | 1.25 | 1.25 | 1.8 | 1.25 | 1.55 | 3.3 |
| $T_1$ (N · mm) | +11.4 | +23.1 | +9.4 | −25.4 | +1.2 | +23 | −43.8 |
| $T_2$ (N · mm) | −41.0 | −66.5 | −61.4 | −16.3 | −26.3 | −100.2 | +123.3 |
| $|T_1 + T_2|$ (N · mm) | 29.6 | 43.4 | 52 | 41.7 | 25.1 | 77.2 | 79.5 |
| Tip rise value (mm) | 3 | 5 | 8 | 5 | 2 | 25 | 30 |

All the steel filaments of the steel cords in above table have a TS≥4100-2000xd, d is the diameter of the individual steel filament.

FIG. 1 shows the measurement of tip rise value. The small piece 100 cut from a rubber ply which is embedded with steel cords 110 has a determined length, width and thickness. The thickness of the rubber ply can be set according to the application mode of the steel cord in the tire, for example, the thickness of the rubber ply is the diameter of the steel cord plus 1.1 mm, and while the width and the length of the rubber ply both are 1 meter. Two of the four corners 105 of the small piece 100 rise. The value T are measured from the thickness direction of the small piece. The bigger one of the two T values of the two rising corners 105 is the tip rise value of the rubber ply. If the tip rise value is more than 10 mm, it is deemed as the occurrence of tip rise problem.

The measurement methods of steel filament diameter and the residual torsion of the steel cord are clearly described in $GB/T_{33159}$-2016.

The residual torsion of the inner strand and the residual torsion of the outer layer are measured as follows:

a) prepare a steel cord sample with a length of about 1.2 m by fusing to make sure the two ends of steel cord sample (the "first end" and the "second end") are not flared, prepare a rack installed with two clamps (the "first clamp" and the "second clamp"), the two clamps are laid at the same horizontal level with a distance of 1 m;

b) clamp the steel cord sample by the first clamp and the second clamp, the first clamp is close to the first end of steel cord sample, and the length from the first end of steel cord sample to the first clamp is about 5 cm to 7 cm (the "reversed length of steel cord");

c) open the first clamp to release the residual torsion of the steel cord sample, and then bend the steel cord sample upwards from the portion to be clamped at the first clamp to make the reversed length of steel cord almost perpendicular to the horizontal level (the "bent portion"); make sure that the bending operation doesn't generate any torsion to the steel cord sample otherwise release the newly generated torsion;

d) cut the first end and peel the steel filaments of the outer layer along the length of the bent portion until the portion of the steel cord sample clamped by the second clamp; clamp the inner strand by the first clamp when the peeling of the steel filaments of the outer layer is sufficient to allow such operation; make sure that the bent portion of the outer layer and the bent portion of the inner strand separately as a group are always perpendicular to the horizontal level during the peeling operation;

e) release the bent portion of the outer layer and obverse and record the number of turns of the bent portion of the outer layer, and this is the residual torsion of the outer layer $RT_2$; and then release the bent portion of the inner strand and obverse and record the number of turns of the bent portion of the inner strand, and this is the residual torsion of the inner strand $RT_1$, the record of the residual torsion is in units of 0.05 turns/m (corresponding to 18° of turning degree) and in "+" if in clockwise direction or "−" if in anticlockwise direction, the observation is done when facing the turning of the bent portion in the direction towards to the second clamp. FIG. 2a-2b shows the examples of residual torsion, FIG. 2a shows the examples of the residual torsion 0.05, 0.25, 0.5, 0.75 and 1.0 in anticlockwise direction, FIG. 2b shows the examples of residual torsion 0.15, 0.25, 0.5, 0.75 and 1.0 in clockwise direction.

From Table 1, it is clear that the invention steel cords have no tip rise problem and have better performance on tip rise compared with the reference steel cords.

The invention claimed is:

1. A steel cord, said steel cord having a construction comprising an outer layer and an inner strand surrounded by and adjacent to said outer layer, said inner strand comprising at least one steel filament with a number of $N_1$, said at least one steel filament of said inner strand having an average diameter of $d_1$ expressed in mm, said outer layer comprising steel filaments with a number of $N_2$, said steel filaments of said outter layer having an average diameter of $d_2$ expressed in mm, wherein said inner strand has a torque $T_1$, said outer layer has a torque $T_2$, $T_1$ and $T_2$ satisfy the following formulas:

$$T_1 = G \times RT_1 \times \pi^2 \times D_1^2 \times d_1^2 \times N_1 / 16000,$$

$$T_2 = G \times RT_2 \times \pi^2 \times (D_1^2 + D_2^2) \times d_2^2 \times N_2 / 16000,$$

$$|T_1 + T_2| < 60,$$

wherein,
- $D_1$ is the theoretical diameter of the inner strand while $D_2$ is the theoretical diameter of the steel cord, $D_1$ and $D_2$ are expressed in mm,
- $RT_1$ is the residual torsion of the inner strand while $RT_2$ is the residual torsion of the outer layer expressed in the number of turns per meter in "+" if in clockwise direction or "−" if in anticlockwise direction,
- G is 80000 N/mm²,
- and the absolute value of $RT_2$ is less than 2 turns per meter and no less than 0.05 turns per meter, and the absolute value of $RT_1$ is no less than 0.05 turns per meter.

2. The steel cord as claimed in claim 1, wherein $T_1$ and $T_2$ satisfy, $|T_1 + T_2| < 50$.

3. The steel cord as claimed in claim 2, wherein $T_1$ and $T_2$ satisfy, $T_1 + T_2| < 40$.

4. The steel cord as claimed in claim 1, wherein the absolute value of $RT_1$ is no less than 0.1 turns per meter.

5. The steel cord as claimed in claim 1, wherein the absolute value of $RT_2$ is less than 2 turns per meter and no less than 0.1 turns per meter.

6. The steel cord as claimed in claim 1, wherein $RT_1$ and $RT_2$ satisfy, $|RT_1 + RT_2| < 4$.

7. The steel cord as claimed in claim 1, wherein said steel cord has a two layers construction, $N_1$ is 1, 2, 3 or 4, the calculation formula of $D_2$ is: $D_2 = D_1 + 2 \times d_2$; and the calculation formula of $D_1$ is:
- when $N_1$ is 1, $D_1 = d_1$, or
- when $N_1$ is 2, $D_1 = 2 \times d_1$, or
- when $N_1$ is 3, $D_1 = 2.155 \times d_1$, or
- when $N_1$ is 4, $D_1 = 2.414 \times d_1$.

8. The steel cord as claimed in claim 1, wherein said steel cord has a three layers construction, wherein the inner strand comprises an intermediate layer and a core layer surrounded by said intermediate layer, said core layer comprises at least one steel filament with a number of $N_c$ and with an average diameter of $d_c$, said intermediate layer comprises steel filaments with an average diameter of $d_m$, the calculation formula of $D_2$ is: $D_2 = D_1 + 2 \times d_2$;
and the calculation formula of $D_1$ is:
- when $N_c$ is 1, $D_1 = d_c + 2 \times d_m$, or
- when $N_c$ is 2, $D_1 = 2 \times d_c + 2 \times d_m$, or
- when $N_c$ is 3, $D_1 = 2.155 \times d_c + 2 \times d_m$, or
- when $N_c$ is 4, $D_1 = 2.414 \times d_c + 2 \times d_m$.

9. The steel cord as claimed in claim 1, wherein said inner strand and said outer layer individually have a twist pitch of less than 40 mm.

10. The steel cord as claimed in claim 1, wherein each steel filament of said steel cord has a tensile strength TS in MPa satisfying, TS≥4000−2000 × d, d is corresponding to the diameter of each steel filament in mm respectively.

11. The steel cord as claimed in claim 10, wherein TS≥4100−2000×d.

12. The steel cord as claimed in claim 1, wherein said steel cord has a construction of 1+3, 1+4, 1+5, 1+6, 1+7, 2+2, 2+3, 2+4, 2+5, 2+5 cc, 2+6, 2+7, 2+7 cc, 2+8, 3+2, 3+3, 3+6, 3+8, 3+8 cc, 3+9, 3+9 cc, 4+3, 4+6, 1+3+8, 1+4+8 cc, 1+4+9, 1+5+10, 1+5+10 cc, 1+6+11, 1+6+12, 1+6+12 cc, 2+5+10, 2+6+12, 3+8+13, 3+9+15 or 4+10+16.

13. A tire comprising at least one belt layer, at least one carcass layer, at least one tread layer and a pair of bead portions, wherein said belt layer and/or said carcass layer comprises at least one steel cord as claimed in claim 1.

\* \* \* \* \*